United States Patent [19]

Brockmann et al.

[11] Patent Number: 4,527,029
[45] Date of Patent: Jul. 2, 1985

[54] ENCAPSULATED, COMPRESSED GAS INSULATED HIGH VOLTAGE SWITCHGEAR

[75] Inventors: Sigismund Brockmann; Ingo Gottschalk, both of Berlin, Fed. Rep. of Germany

[73] Assignee: Siemens Aktiengesellschaft, Berlin and Munich, Fed. Rep. of Germany

[21] Appl. No.: 618,020

[22] Filed: Jun. 7, 1984

[30] Foreign Application Priority Data

Jun. 15, 1983 [DE] Fed. Rep. of Germany ....... 3321836

[51] Int. Cl.³ .............................................. H01H 33/54
[52] U.S. Cl. ................................ 200/148 B; 361/115; 361/331
[58] Field of Search .................... 200/148 B; 361/331, 361/115

[56] References Cited

U.S. PATENT DOCUMENTS 4,107,498  8/1978  Golota .............................. 200/148 B Primary Examiner—Robert S. Macon
Attorney, Agent, or Firm—F. W. Powers; J. L. James

[57] ABSTRACT

In an encapsulated, compressed gas-insulated high-voltage switchgear there is arranged in the interior of the encapsulation a drive and breaker units actuated by it. The breaker units are carried by a flange plate which closes the encapsulation off so that is is pressureproof. The flange plate is connected with the drive on the side away from the interior. To secure the position of the breaker units and hence also the coupling between them and the respective drive independently of the compressive stress of the flange plate, a substantially flat support plate is provided which directly receives the breaker units and which, extending parallel with the flange plate, is connected therewith via at least three parallel spacers which are arranged in a triangle.

4 Claims, 3 Drawing Figures

ENCAPSULATED, COMPRESSED GAS INSULATED HIGH VOLTAGE SWITCHGEAR

BACKGROUND OF THE INVENTION

The invention relates to an encapsulated, compressed gas-insulated high-voltage switchgear, such as a power switch, in which the drive-actuated breaker units are disposed in the interior of the encapsulation and are located on a flange plate which closes the encapsulation off so that it is pressureproof and which is connected with the drive on the side away from the interior.

In a switchgear of this type, the switching points are secured directly on the flange plate, which has a thick wall for the alternating compressive stress occurring during operation. Before the encapsulation is filled with the insulating gas, such as sulfur hexafluoride, the interior of the encapsulation is largely evacuated, so that bending forces result which act to arch the flange plate inwardly. After the encapsulation has been filled, operation forces result due to the internal pressure, which act to arch the flange plate outwardly. Even if the flange plates are very thick, it is difficult to fix the normal position of the breaker units in the interior of the encapsulation without additional fastening means.

SUMMARY OF THE INVENTION

It is an object of the invention to secure the position of the breaker units and also the coupling between the breaker units and the respective drive independently of the compressive stress exerted on the flange plate.

According to the invention, this object is achieved by utilizing an essentially flat support plate which directly receives the breaker units, and which, extending parallel with the flange plate, is connected therewith via at least three parallel spacers arranged in a triangle.

By utilizing the invention, the form of the support plate and hence also the position of the breaker units connected with it is preserved, even if arching of the flange plate should occur. Accordingly, the flange plate can be made with thinner walls than before.

According to an advantageous embodiment of the invention, the spacers are formed by flat sections of rectangular cross-section. A form of realization especially stable as to position is obtained if the cross-section of one of the spacers is arranged rotated by 90° in relation to that of the other two spacers, which are oriented in parallel planes. Then, the two plates can no longer execute any relative movements in the direction of the plate planes.

For the manufacture of the encapsulated high-voltage switchgear according to the invention is is advantageous if the ends of the spacers are connected with the flange plate and with the support plate in a physically locked manner. Welding is particularly suitable for such a type of connection.

Other features and advantages of the present invention will become apparent from the following detailed description, and from the claims.

For a full understanding of the present invention, reference should now be made to the following detailed description and to the accompanying drawings.

DETAILED DESCRIPTION

Figure 1:
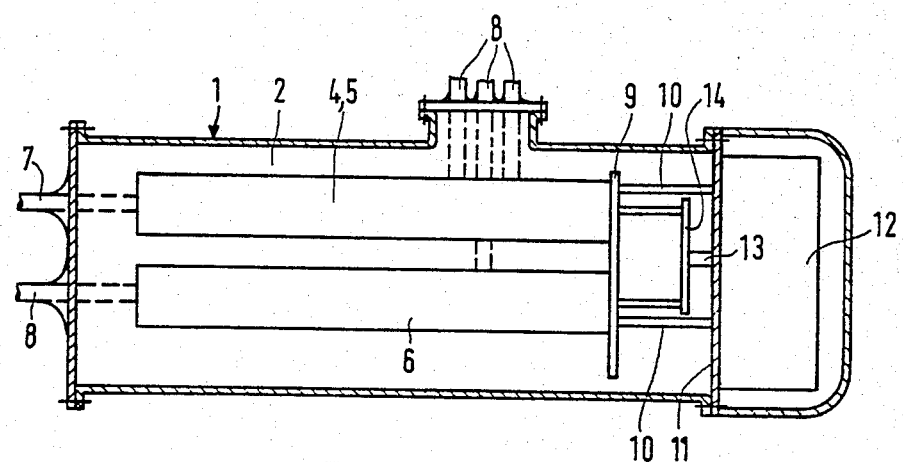
FIG. 1 shows an encapsulated, compressed gas-insulated high voltage power switch, partly in section.
Figure 2:
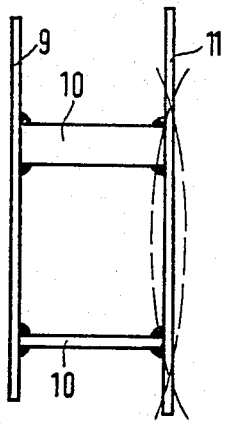
FIG. 2 is a detailed view of the support plate, the spacers and the flange plate contained in FIG. 1.
Figure 3:
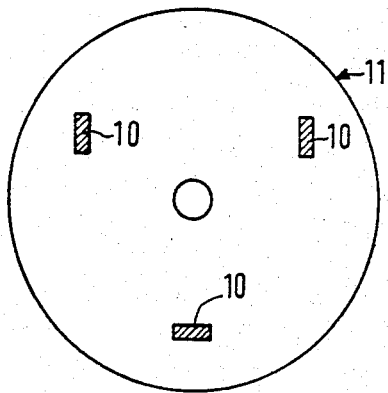
FIG. 3 is a side view of the flange plate and spacers contained in FIG. 1.

The high-voltage switchgear illustrated in FIG. 1 is designed as a power switch and comprises substantially tubular encapsulation 1 which is made of metal and is grounded during operation. In the interior 2 of encapsulation 1 are breaker units 4, 5 and 6 which are intended for the three poles of the three-phase current system RST. These units are connected by end-face connectors 7 on the one hand and by connectors 8 on the other hand to the rest of the encapsulated, compressed gas-insulated high-voltage switch system. In interior 2 of the encapsulation is an insulating gas, such as sulfur hexafluoride, under a pressure of 6 bar. This gas serves at the same time as a quenching medium for breaker units 4, 5 and 6. The breaker units 4, 5 and 6 are arranged mechanically fixed on support plate 9, which is held spaced from end-face flange plate 11 by spacers 10. The flange plate 11 closes off the second end-face of tubular encapsulation 1 so that it is pressureproof. On the side away from the interior it carries drive 12, which actuates breaker units 4, 5 and 6. For this purpose drive rod 13 is passed through flange plate 11, which transmits the movement of the drive, via a distributor plate 14, to all breaker units 4 to 6 simultaneously. Due to the arrangement of support plate 9 and through the connection of this support plate via spacers 10, the position of breaker units 4 to 6 in the interior is reliably ensured also when bending action forces flange plate 11 to be arched inwardly or outwardly. This is especially clear from FIG. 2, in which only support plate 9, spacers 10 and flange plage 11 are shown. On the basis of the arrangement shown by FIGS. 2 and 3, flange plate 11 can arch either way without support plate 9 being arched as well. The arrangement of spacers 10 shown in FIGS. 2 and 3 thus ensures an effective separation of the resulting mechanical stress of flange plate 11 from support plate 9 and from breaker units 4, 5 and 6 which are connected with drive 12.

The spacers 10 are formed, as can be seen, from a flat section of rectangular cross-section, with the cross-section of one of the spacers being arranged rotated by 90° in relation to that of the other two spacers, which are oriented in parallel planes. In the embodiment shown, the ends of the spacers are connected with the flange plate and with the support plate in a physically locked manner such as by welding.

There has thus been shown and described an arrangement for an encapsulated, compressed gas insulated high-voltage switchgear which fulfills all the objects and advantages sought therefor. Many changes, modifications, variations and other uses and applications of the subject invention will, however, become apparent to those skilled in the art after considering the specification and the accompanying drawings which disclose embodiments thereof. All such changes, modifications, variations and other uses and applications which do not depart from the spirit and scope of the invention are deemed to be covered by the invention which is limited only by the claims which follow.

What is claimed is:

1. In an encapsulated, compressed gas-insulated high-voltage switchgear, having drive-actuated breaker units disposed in the interior of the encapsulation and supported by a flange plate which closes the encapsulation so it is pressureproof and which is connected with the drive on a side away from the interior, the improvement wherein an essentially flat support plate which directly receives the breaker units, and which, extending parallel with the flange plate, is connected therewith via at least three parallel spacers arranged in a triangle.

2. The high-voltage switchgear according to claim 1, wherein the spacers are formed by flat sections of rectangular cross-section.

3. The high-voltage switchgear according to claim 2, wherein the cross-section of one of the spacers is arranged rotated by 90° in relation to that of the other two spacers which are oriented in parallel planes.

4. The high-voltage switchgear according to claim 1, wherein the ends of the spacers are connected with the flange plate and with the support plate in a physically locking manner.

* * * * *